United States Patent Office 3,522,158
Patented July 28, 1970

3,522,158
PRODUCTION OF GRAFT POLYMERS
OR COPOLYMERS BY THE USE OF
RADIATION
John Lyndon Garnett, Longueville, New South Wales, and Sergio Dilli, Earlwood, New South Wales, Australia, assignors to Unisearch Limited, a corporation of Australia
No Drawing. Continuation of application Ser. No. 411,723, Nov. 17, 1964. This application Oct. 21, 1968, Ser. No. 769,437
Int. Cl. C08j 1/04; B01j 1/10
U.S. Cl. 204—159.12            7 Claims

ABSTRACT OF THE DISCLOSURE

A process for the production of graft polymers by ionizing radiation, wherein a hydrophilic backbone polymer is irradiated in the presence of a solution of a monomeric vinyl compound polymerizable by free radical or ionic mechanism in a solvent, the solvent being selected from a specified group capable of swelling the backbone polymer to enable the monomer to gain access to active sites on the backbone polymer generated by radiation which is carried out at a dose rate and with a concentration of monomer in the solvent which together produce a maximum amount of grafting for a given total dose rate.

---

This is a continuation of application Ser. No. 411,723 filed on Nov. 17, 1964.

By graft copolymers is meant, polymers formed from a "backbone" or "trunk" polymer to which has been grafted a number of side-chains or branches of a second polymeric material. It is commonly known that the properties of copolymers may be different from the two materials used in their preparation and possess, usually, some of the properties of each, and so this endows the copolymer with distinct advantages.

In this invention, suitable backbone polymers include cellulose, in the form of paper, fibres, powder, rayon (regenerated cellulose) or any of its derivatives such as the ethers and esters of cellulose both aliphatic and aromatic which are hydrophilic, and rayon, and other hydrophilic polymeric materials both natural and synthetic, such as wool, starch, silk, and many others in the form of fibres or fabrics or animal hairs and the like.

By ionizing radiation is meant $\beta$-rays, $\gamma$-rays, accelerated electrons and particles, X-rays, ultraviolet radiation, or mixtures of them such as may be furnished by atomic piles, particle accelerators, radioisotopes, X-ray and other suitable equipment.

The general object of the present invention is to produce graft copolymers by the use of radiation in a manner in which a high degree of grafting of the second polymeric material is achieved by the use of a relatively low radiation dose rate and total dose.

The invention consists in a process for the production of graft copolymers by ionizing radiation, wherein a hydrophilic backbone polymer is irradiated in the presence of a solution of a monomeric vinyl compound polymerizable by free radical or ionic mechanism in a solvent, the solvent being selected from the group of solvents comprising lower aliphatic alcohols up to $C_3$, ketones up to $C_6$, dimethylformamide, pyridine and dimethylsulfoxide, said solvents being capable of swelling the backbone polymer to enable the monomer to gain access to active sites on the backbone polymer generated by radiation, the irradiation being carried out at a dose rate and with a concentration of monomer in the solvent which together produce a maximum amount of grafting for a given total dose rate, the concentration of monomer in the solvent lying between 30% and 80% by volume. Under these conditions the solvent is at or near the "peak concentration," this term being defined below.

Materials suitable for grafting to the backbone polymer, according to this invention may be any monomeric vinyl compound polymerizable by free radical or ionic mechanisms. Typical compounds are for example styrene, methylmethacrylate, acrylonitrile, acrylamide, vinyl pyridines, vinyl carboxylic acids, and many others.

It is important that a suitable solvent for the monomer must be used for efficient grafting. For grafting to be efficient, a solvent must be capable of swelling the backbone polymer to enable the monomer to gain access to the active sites generated by the radiation. The solvents suitable for this function have a high dipole moment and are the lower aliphatic alcohols, up to $C_3$, lower ketones up to $C_6$, and other water miscible compounds including dimethylformamide. Alcohols higher than propanol in the homologous series must be excluded due to their marked inhibition of the grafting process. Methanol, ethanol and acetone are examples of suitable solvents.

The present invention is based on the discovery that the grafting of a monomer is a maximum for a given dose rate and total dose for a very specific concentration, referred to in this specification as to peak concentration, of monomer in solvent. The actual concentration at which this peak occurs will vary with different materials, for styrene for example it occurs at about 40% by volume. The grafting falls sharply at concentrations above and below this value. The nature of the peak is dependent upon both dose rate and total dose for any particular monomer. For example, in the case of styrene a pronounced peak at a dose rate of 82,000 rads per hour is obtained, but at 140,000 rads per hour the peak is much smaller, whilst at a dose rate of 250,000 rads per hour the effect is absent for the same total dose of 1 megarad.

Peak concentrations for other materials are as follows:

Methylmethacrylate about 60%

This is illustrated by the following figures showing the percent increase in weight obtained by irradiation at a dose rate of 45,000 rads per hour at a temperature of 25° C.

| Exposure time, hours | Monomer concentration, percent V./V. | | | |
|---|---|---|---|---|
| | 20 | 40 | 60 | 80 |
| 3 | 0 | 15.3 | 36.8 | 17.2 |
| 4 | 0 | 59.8 | 100.0 | 78.3 |

4-vinyl pyridine about 70%

Processes acording to this invention may be carried out by irradiations both in the presence and absence of oxygen. While advantages may obtain in some instances for irradiation in the absence of oxygen, the presence of oxygen does enhance grafting in others. Simple experiments can clarify this position.

In the grafting process, homopolymerization will occur concomitantly with the grafting process. Homopolymers may be removed by the use of a suitable solvent, if this is necessary, without detriment to the copolymer.

The processes of this invention are illustrated in the following examples:

EXAMPLE 1

A strip of cellulose in the form of filter paper (0.180 gram) is placed in a glass ampoule and covered with a solution of styrene monomer in methanol (6 millilitres of about 40% volume to volume concentration). The ampoule is sealed and exposed to γ-radiation from Co⁶⁰-source at a dose rate of 81,000 rads per hour. After exposure (12 to 13 hours) the swollen strip is removed from the tube and washed in hot benzene to remove homopolymer. The weight of strip after this treatment is 0.280 gram.

The tubes after exposure can be exhausted under vacuum to recover unused monomer. Any homopolymer can be recovered from the benzene solution after extraction is complete.

EXAMPLE 2

A strip of cellulose in the form of filter paper (0.175 gram) is placed in a glass ampoule and covered with a solution of styrene monomer in methanol (6 millilitres of about 40% volume to volume concentration). The ampoule is sealed and exposed to γ-radiation from Co⁶⁰-source at a dose rate of 7,000 rads per hour. After exposure (20 hours) the swollen strip is removed from the tube and washed in hot benzene to remove homopolymer. The weight of strip after this treatment is 0.387 gram.

It will be seen that in the example a greatly increased graft is obtained with a lower total dose by using a lower dose rate. The same increase in weight as in Example 1 could have been obtained by reducing the exposure time.

EXAMPLE 3

Strips of filter paper treated as described in Example 1 but having a 10% graft give the following results, indicating the benefits of this treatment:

|  | Wet Breaking Length, km. | Wet Stretch, Percent |
|---|---|---|
| Before irradiation | 0.07 | 0.3 |
| After irradiation | 0.93 | 2.6 |

EXAMPLE 4

This example illustrates the advantage of using lower grade raw material (cellulose) in place of the more highly refined cellulose of filter paper.

In each case, the raw material received identical radiation dose, dose rate and other treatments as outlined in Example 1 including the same volume of the same solution of styrene in methanol (40%).

| Raw material: | Percent increase in weight (percent graft) |
|---|---|
| Filter paper | 54.7 |
| Mechanical pulp (Pinus radiata containing 25% lignin) | 60.7 |
| Kraft pulp (Pinus radiata containing 8% lignin) | 8.5 |

EXAMPLE 5

Small staples of wool are placed in ampoules and immersed in various solutions or in pure monomer. The ampoules, sealed in presence or absence of oxygen, are exposed to an atomic reactor spent fuel source at dose rate of 390,000 rads per hour for 3 to 16 hours. After exposure, the samples are removed for extraction in hot benzene. The following results show the variations in weight increase experienced with different solvents and in the presence or absence of oxygen.

| Atmosphere | Liquid phase | Percent weight increase |
|---|---|---|
| Vacuum | Pure styrene | Nil |
| Do | 60% (v./v.) styrene in benzene | 3 |
| Do | 40% (v./v.) styrene in methanol | 21 |
| Do | 60% (v./v.) styrene in methanol | 340 |

In the second case it should be noted that concentration chosen is greater than the peak concentration and the solvent used is a non-swelling solvent.

While the invention is of general applicability in the production of graft copolymers it is considered to have special value in the treatment of paper and cardboard to produce materials of greatly increased strength, especially wet strength, and increased resistance to acids and alkalis. The treatment of other natural materials such as wood and wool is a further application of the invention believed to have considerable commercial possibilities.

What is claimed is:
1. A process for grafting a vinyl monomer selected from the group consisting of styrene, methyl methacrylate and vinyl pyridine onto cellulose which comprises
   (a) dissolving said vinyl monomer with a water miscible solvent from the group consisting of aliphatic alcohols having from 1 to 3 carbon atoms, dimethylformamide and acetone,
   (b) contacting said solution with cellulose and irradiating said mixture with high energy ionizing radiation at a dose rate of below 0.250 megarad per hour and a total dose of less than one megarad wherein when said vinyl monomer is styrene, the concentration of said monomer in said solvent is about 40% by volume, when said vinyl monomer is methyl methacrylate, the concentration of the monomer in the solvent is about 60% by volume and when said vinyl monomer is vinyl pyridine, the concentration of the monomer in the solvent is 70% by volume.
2. The process of claim 1 wherein said vinyl monomer is methyl methacrylate.
3. The process of claim 1 wherein said vinyl monomer is styrene.
4. The process of claim 1 wherein said vinyl monomer is vinyl pyridine.
5. The process of claim 1 wherein when said monomer is styrene the radiation dose rate is 82,000 rads per hour and when said monomer is methyl methacrylate, said radiation dose rate is 45,000 rads per hour.
6. The process of claim 1 wherein cellulose is in the form of paper, wood pulp or wood.
7. The process of claim 1 wherein the cellulose is in the form of wool fibres.

References Cited

Chapiro et al., Direct Radiation Grafting onto Hydrophilic Polymers, Int. Jrnl. of App. Radiation and Isotopes, vol. 8 (1960), pp. 164–167.

MURRAY TILLMAN, Primary Examiner

R. B. TURER, Assistant Examiner

U.S. Cl. X.R.

117—13, 31; 260—17, 17.4

UNITED STATES PATENT OFFICE
CERTIFICATE OF CORRECTION

Patent No. 3,522,158         Dated July 28, 1970

Inventor(s) John Lyndon Garnett and Sergio Dilli

It is certified that error appears in the above-identified patent and that said Letters Patent are hereby corrected as shown below:

Page 1, column 1, in the heading at line 11, after "769,437" insert -- claims priority, application Australia, Nov. 19, 1963, 37832/1963 --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents